United States Patent
Clifton, Jr.

(10) Patent No.: US 7,347,500 B2
(45) Date of Patent: Mar. 25, 2008

(54) SEAT BELT RECEIVER ATTACHMENT

(76) Inventor: Norman E. Clifton, Jr., 607 Trumpet Vine Ct., Jacksonville, FL (US) 32225

( * ) Notice: Subject to any disclaimer, the term of this patent is extended or adjusted under 35 U.S.C. 154(b) by 257 days.

(21) Appl. No.: 11/113,766

(22) Filed: Apr. 25, 2005

(65) Prior Publication Data

US 2006/0249945 A1    Nov. 9, 2006

(51) Int. Cl.
*B60R 22/00* (2006.01)
(52) U.S. Cl. .................... 297/482; 280/801.1
(58) Field of Classification Search ............ 297/482, 297/463.2, 468; 280/801.1
See application file for complete search history.

(56) References Cited

U.S. PATENT DOCUMENTS

| | | | | |
|---|---|---|---|---|
| 4,070,038 A | * | 1/1978 | Bergman et al. ............ | 297/482 |
| 4,527,835 A | * | 7/1985 | Barnett .................... | 297/482 |
| 4,939,824 A | * | 7/1990 | Reed ...................... | 24/633 |
| 4,944,530 A | * | 7/1990 | Spurrier .................. | 280/801.1 |
| 4,961,251 A | * | 10/1990 | Smith ..................... | 24/633 |
| 5,098,162 A | * | 3/1992 | Forget et al. .............. | 297/482 |
| 5,135,256 A | * | 8/1992 | Weller .................... | 280/751 |
| 5,158,339 A | * | 10/1992 | Miyanaga ................. | 297/482 |
| 5,617,617 A | * | 4/1997 | Gustin .................... | 24/633 |
| 5,951,112 A | * | 9/1999 | Hansson .................. | 297/482 |
| 6,105,219 A | * | 8/2000 | Beadle ................... | 24/633 |
| 6,138,331 A | * | 10/2000 | Powers ................... | 24/633 |
| 2004/0140660 A1 | * | 7/2004 | Xu ....................... | 280/808 |

* cited by examiner

*Primary Examiner*—David Dunn
*Assistant Examiner*—Tania Abraham
(74) *Attorney, Agent, or Firm*—Arthur G. Yeager

(57) ABSTRACT

A seat belt receiver attachment includes an elongate connection member removably mountable closely adjacent a seat belt receiver and a planar flexible shield member having an inside surface locatable adjacent a holster worn by a user with the outside surface being adjacent a seat belt receiver. The shield member and connection member include spaced side edge portions and a plurality of pairs of spaced mounting holes and may include a pair of spaced ears having mounting holes therethrough. Elongate straps are threadable through the mounting holes to secure the members together. A releasable fastener attaches the members together for assembly positioning.

23 Claims, 5 Drawing Sheets

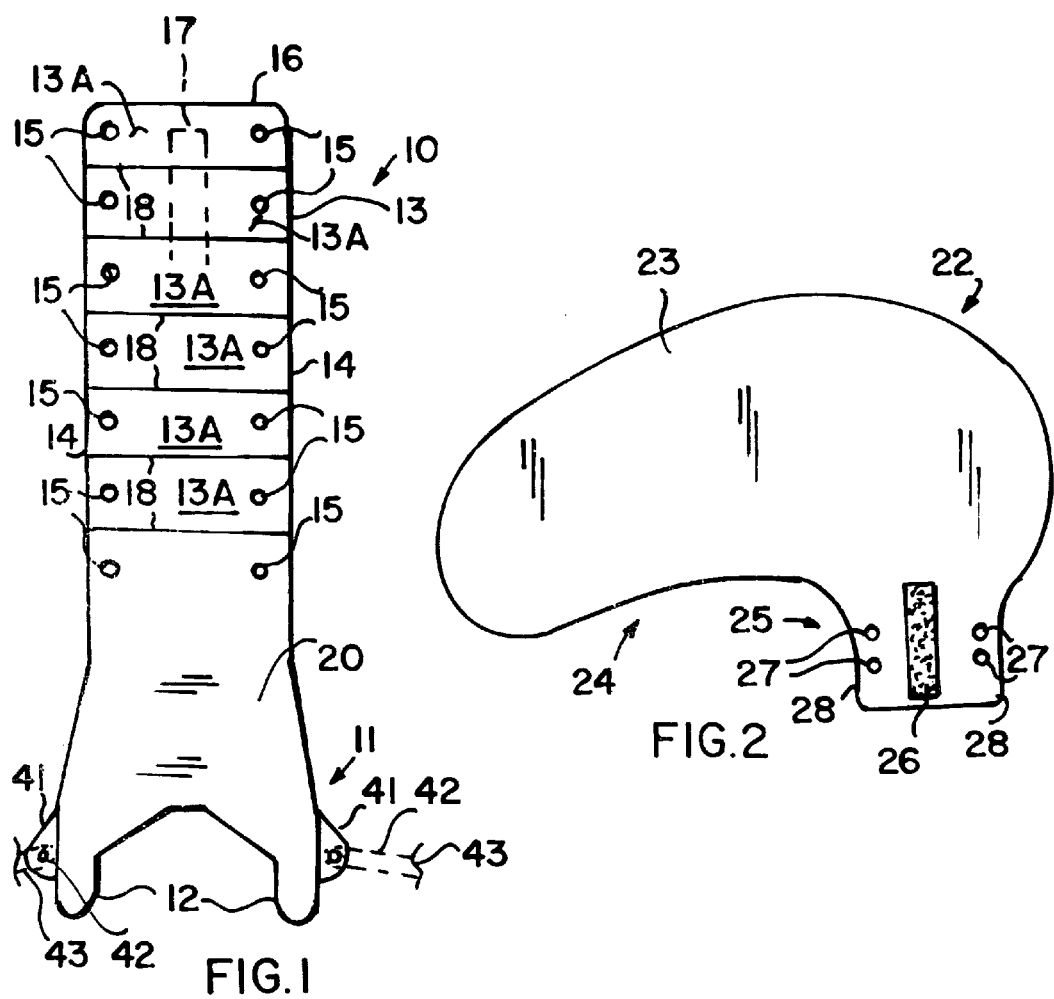

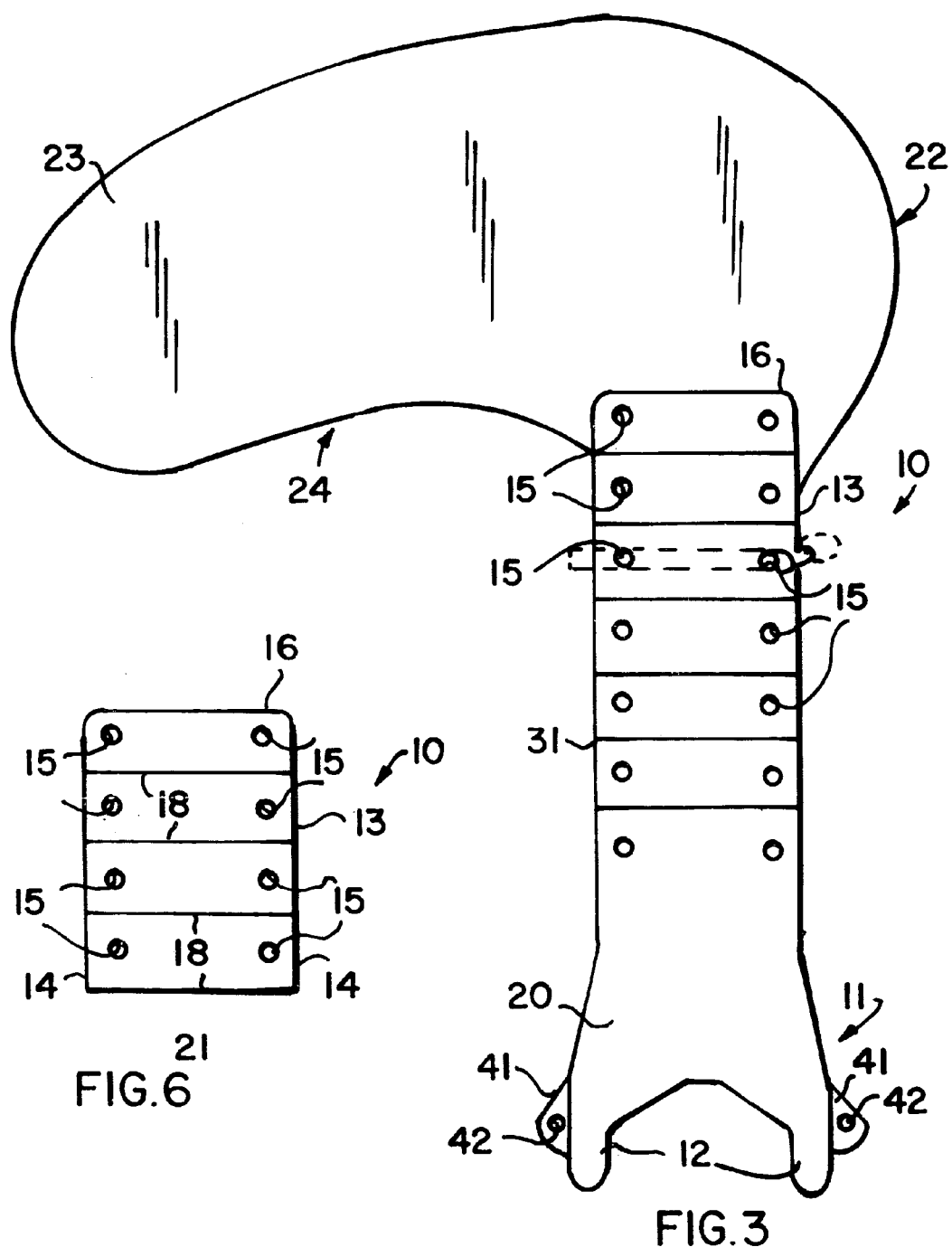

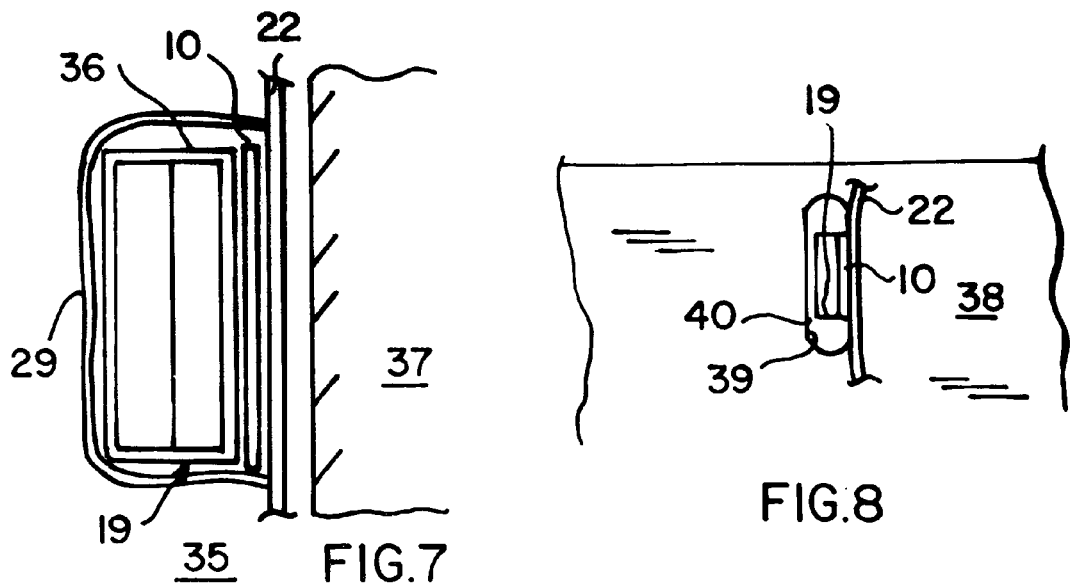
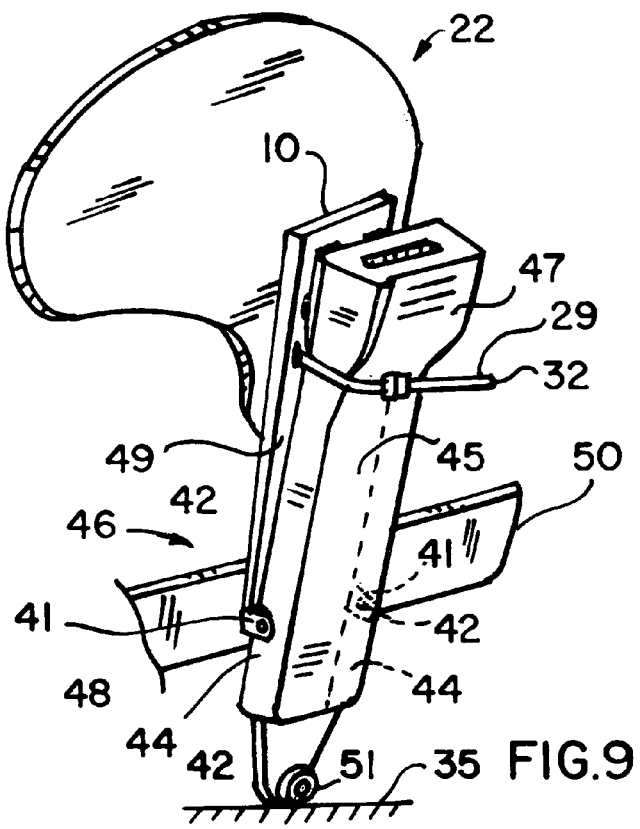

SEAT BELT RECEIVER ATTACHMENT

CROSS-REFERENCE TO RELATED APPLICATION

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of the Invention

The present invention relates to attachments to a seat belt receiver for protecting a handgun holster from abrasion of the holster due to repeated contact with the receiver and particularly to holster protectors that are adjustable in height and adaptable to different seat belt receivers.

2. Relevant Art

Law enforcement personnel that wear handgun holsters in motor vehicles often have extensive abrasion of a holster due to repeated contact between the holster and the receiver for the lap/shoulder belt. What is desired is a holster protector or shield that can be removably attached in or closely adjacent the receiver between the receiver and the holster. The protector portion that connects to the receiver should be adjustable in height and adaptable to different receiver types. Furthermore, the primary contact member that rests against the holster should be easily replaceable and also adjustable in height with respect to the receiver connecting member. None of the prior art protectors provide all the desired features.

BRIEF SUMMARY OF THE INVENTION

In one aspect of the present invention there is provided a seat belt receiver attachment comprising a connection member having an inside surface and an outside surface removably mountable closely adjacent a seat belt receiver, and having a lower portion and an upper portion, a flexible shield member having an inside surface locatable adjacent a holster worn by a user and an outside surface adjacent a seat belt receiver and securing means for attaching the shield member to the upper portion of the connection member. The shield member includes an upper portion and a lower portion including a pair of spaced openings, the securing means including a strap passing through the pair of spaced openings. The connection member includes an elongate body having spaced side edge portions and a pair of spaced mounting holes each being disposed adjacent a respective side edge portion of the connection member, the securing means including a strap passing through the pair of spaced holes. The securing means including an elongate strap threadable through said one pair of spaced openings in said shield member and through said pair of spaced holes in said connection member, said strap being adapted to engage a receiver to locate and maintain a selected orientation of said attachment. The body of the connection member includes a plurality of spaced transverse score lines for permitting breakage of the body along a selected score line to shorten the length of the body as desired by a user. The lower portion of the connection member includes a pair of spaced legs below a seat belt receiver and locating the attachment in a position desired by a user. The shield member includes a flexible planar member conformable to a portion of a body and an attached holster of a user when a seat belt is secured into a seat belt receiver when in use. There is also a plurality of pairs of spaced holes located in each transverse panel, the securing means including a strap passing through selected pairs of spaced holes. A first fastener portion is attached to the outside surface of the shield member and a second fastener portion attached to the inside surface of the connection member, the fasteners portions engaging each other for removably holding the shield member and the connection member together.

In another aspect of the present invention there is a seat belt receiver attachment comprising an elongate connection member having an inside surface and an outside surface removably mountable closely adjacent a seat belt receiver, the connection member having a lower portion including a lower flared flange portion and a pair of spaced apart ears subtending from the flange portion, and a planar flexible shield member having an inside surface locatable adjacent a holster worn by a user and a holster worn by a user and an outside surface locatable adjacent a holster worn by a user and a holster worn by a user and an outside surface adjacent a seat belt receiver, securing means for attaching the shield member to the upper portion of the connection member. The shield member includes an upper portion and a lower having side edges, the lower portion of the shield member including a plurality of pairs of spaced mounting holes, each hole being adjacent a respective edge for securing the shield member to the connection member. The connection member includes spaced side edge portions and a plurality of pairs of spaced mounting holes, each hole being disposed adjacent a respective side edge portion for securing the connection member to the shield member. The securing means includes an elongate strap threadable through at least one pair of spaced mounting holes in the shield member and through at least one pair of spaced mounting holes in the connection member. The body of the connection member includes a plurality of transverse score lines for breaking the body along a score line to shorten the length of the body. The lower portion of the connection member includes a pair of spaced legs to rest the attachment below a seat belt receiver for securing the attachment in a position desired by a user. The shield member includes a flexible planar member conformable to a portion of the body of a user when a seat belt is secured into a seat belt receiver. A first fastener is attached to the outside surface of the shield member and a second fastener attached to the inside surface of the connection member, the fasteners cooperating for removably holding the shield member and the connection member together.

In a further aspect of the present invention there is provided a seat belt receiver attachment comprising an elongate connection member having an inside surface and an outside surface removably mountable closely adjacent a seat belt receiver, the connection member having a lower portion including a lower flared flange portion and a pair of spaced apart ears subtending from the flange portion, and a planar flexible shield member having an inside surface locatable adjacent a holster worn by a user and an outside surface adjacent a seat belt receiver, securing means for attaching the shield member to the upper portion of the connection member, the connection member and the shield member each including spaced side edge portions and a plurality of pairs of spaced mounting holes each hole being disposed adjacent a respective side edge portion for securing the connection member to the shield member. The securing means includes an elongate strap threadable through at least one mounting hole in the shield member and through at least one mounting hole in the connection member.

BRIEF DESCRIPTION OF THE SEVERAL VIEWS OF THE DRAWING

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

FIG. 1 illustrates the receiver connection member in accord with the present invention;

FIG. 2 illustrates the holster shield member in accord with the present invention;

FIG. 3 illustrates the assembled seat belt receiver attachment in accord with the present invention;

FIG. 6 is a plan view of the connection member broken off at a score line to lower the height of the assembly as desired;

FIG. 7 is a top view of a seat belt receiver for use with separated vehicle seats;

FIG. 8 is a top view of a seat belt receiver mounted through a bench-type vehicle seat;

FIG. 9 is a perspective view of a preferred embodiment of the assembled attachment in accord with the present invention as installed in one application;

DETAILED DESCRIPTION OF THE INVENTION

Figure 4:
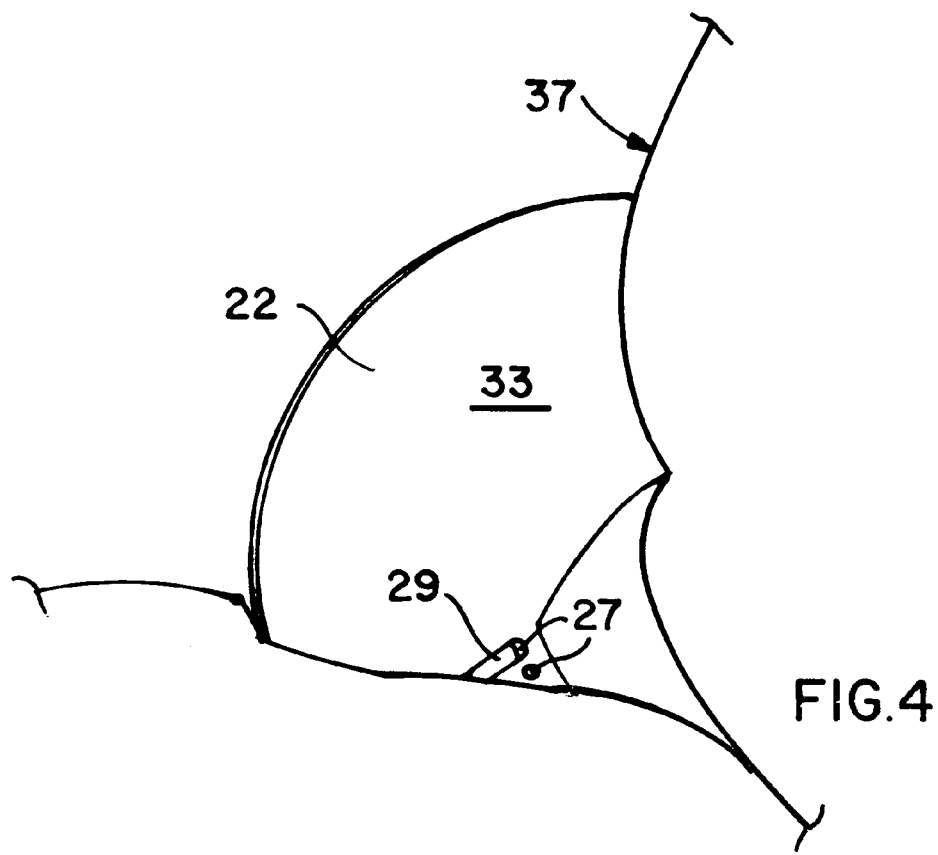
FIG. 4 is a perspective diagrammatic view of the assembled attachment installed adjacent a seat belt receiver.

With respect now to the drawings, the seat belt receiver connecting and mounting member is show at numeral 10 in FIG. 1. The mounting member 10 has a planar lower portion 11 formed to include two spaced apart legs 12 subtending therefrom and sized to fit closely adjacent a seat belt receiver to hold member 10 substantially vertically. Legs 12 may span across the base of a receiver depending upon its construction. An elongated upper portion 13 is planar and has spaced opposite side edge portions 14 and a plurality of vertical spaced pairs of mounting openings or holes 15 adjacent respective side edge portions 14. Laterally extending ears 41 having openings 42 for use with a second strap 43 as will be discussed hereinbelow.

Adjacent a top edge portion 16 of upper portion 13 are first fastener means 17 preferably formed of a fluff member of Velcro fasteners or similar means such as snaps and the like.

A plurality of transverse score lines 18 are spaced along upper portion 13 and define a plurality of transverse panels 13A to provide a height and receiver adapting capability. One pair of holes 15 is formed in each panel 13A. If the space adjacent a seat belt receiver 19 is too narrow to accommodate the flange end 20 of lower portion 11 and the integrally formed spaced legs 12, the lower portion 11 can be broken off allowing a newly formed lower edge portion 21 of upper portion 13 to be inserted adjacent the receiver 19 as shown clearly in FIG. 6. Selection of the appropriate score line 18 provides for height of adjustment at the same time.

FIG. 2 illustrates the outside surface 23 of paddle-shaped protector or contact member. Member 22 includes a large resilient kidney-shaped upper portion 24 and an elongated integrally formed lower portion 25.

Second fastener means 26 is carried on lower portion 25 of member 22 and may be Velcro "hook" members or other cooperating fastener means.

The fastener means 17 and 26 are used principally to removably hold the shield member 22 to the connection member 10 while strap 29 is threaded through the selected respective mounting holes therein as desired, but could be used alone or with strap 29 if desired. Accordingly, the length of connection member 22 can be shortened by breaking off upper transverse panels of member 22 even if the fastener portion 17 is removed.

Figure 5:
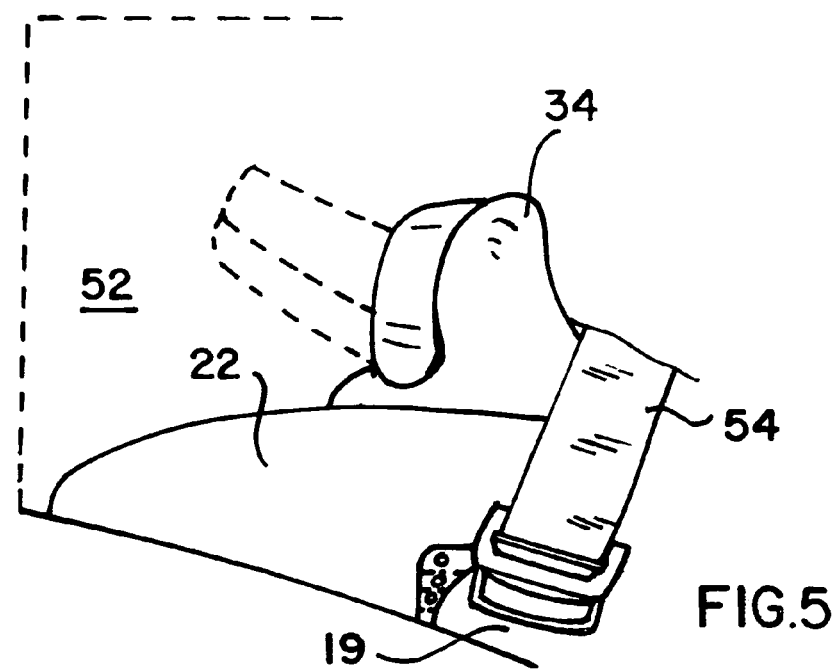
FIG. 5 is another perspective view of the attachment installed adjacent a seat belt receiver.

Two vertically disposed pairs of spaced mounting openings or holes 27 are formed adjacent side edge portions 28 of lower portion 25 of member 22. Only one such pair 27 is usually necessary. Securing means for attaching the members 10 and 22 together includes a plastic strap 29 having a stop member end portion 30 with a passageway therethrough for securing the strap as understood in the art, an elongate body 31 and a pointed other end portion 32 and mounts the paddle member 22 to the upper portion of mounting member 10 by threading the strap 29 through corresponding pairs of mounting holes 15 and 27 to place smooth planar inside surface 33 of member 22 adjacent a worn holster 34 (FIG. 5). Preferably legs 12 or lower edge portion 21 (FIG. 6) will rest near or against the floor 35 of a vehicle when the attachment assembly is installed in a specific seat belt receiver.

FIG. 7 shows a seat belt receiver 19 adjacent a "bucket" type seat 37. The receiver is carried by housing 36. In this construction, strap 29 wraps around the receiver housing 36 to secure the member 10 thereto.

FIG. 8 shows a seat belt receiver mounted through a "bench" type seat 38 via cavity 40 having a space 39 around receiver 19. In this construction the connection member 10 is fitted into space 39 and strap 29 may or may not be wrapped around receiver 19 depending upon the specific construction details.

In addition, the paddle member 22 is sufficiently flexible to bend against and conform to a portion of the body of a user and carried holster when a seat belt 54 (FIG. 5) is properly worn. Finally, the use of flared lower flange end 20 of connection member 10 may be used or removed depending upon the specific mounting and structural features of a seat belt receiver 19, which varies with motor vehicle models.

With regard to FIG. 9, the preferred embodiment of the attachment member includes a pair of ears 41 that are integral with legs 12 and are bendable to position ears 41 adjacent sides 44 of seat belt receiver 45. The ears 41 have mounting holes 42 that are used with an optional second strap 43 to secure the inside surface 49 of lower portion 48 of member 10 to seat receiver 45. In this construction, a seat belt receiver 45 includes an enlarged upper portion 47 which acts as an upper stop when member 10 is secured via upper strap 29. The construction and location of the receiver 45 in this application illustrated a binding point 46 between receiver 45 and seat frame 50 that functions as a downward stop that will limit the downward motion of member 10. In this application, a second strap 43 may not be necessary because the position of bent legs carrying ears 41 is such to hold the member 10 vertically and inhibit forward and/or rearward motion thereof.

Figure 10:
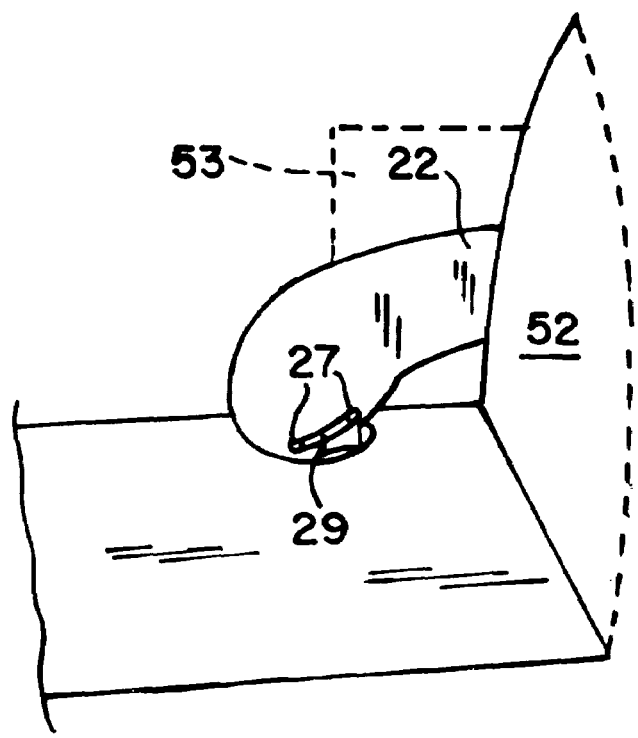
FIG. 10 is a perspective view of the holster shield according to the present invention as attached in another application.
Figure 11:
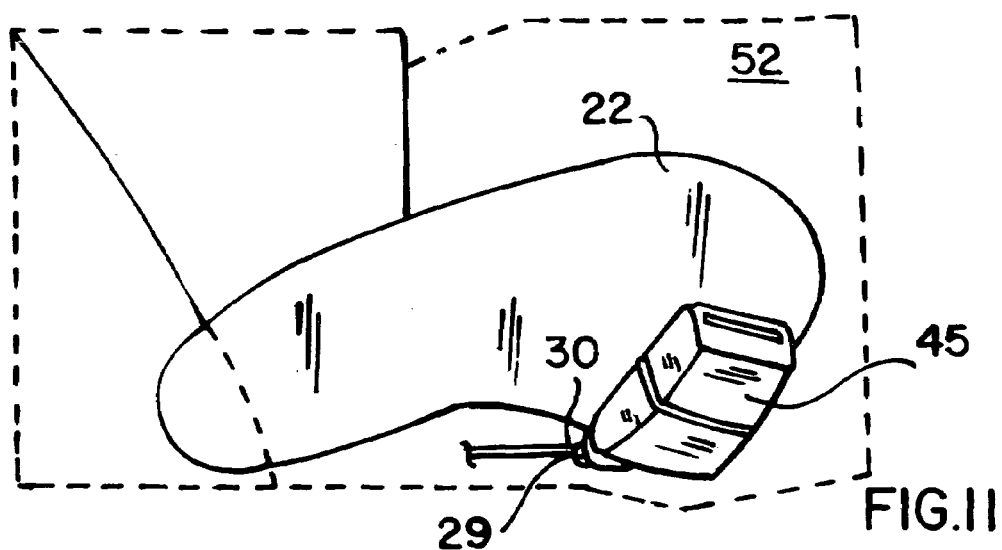
FIG. 11 is another perspective view of the holster shield installation of FIG. 10.

With respect to FIGS. 10-11, protector member 22 is shown in use without the mounting member 10 being connected. Instead, strap 29 is threaded through openings 27 in lower portion 25. Strap 29 is wrapped around the seat belt receiver 45 as shown clearly in FIG. 11.

This arrangement is usable with a seat 52 wherein there is another structure 53, such as a console or other apparatus, which the member 22 can engage frictionally although such other structures are not necessary for the function of the shield 22.

The fastener means 17, 26 preferably is of the fluff and hook variety. If the connection member 10 is not used the fluff member 17 can be mounted on a side of a seat belt receiver 45. This embodiment results from the apparatus as described hereinabove in a kit form. That is, the mounting member 10, paddle member 22, straps 29 and 43, and the two fasteners 17 and 26 are supplied to a user who can then create the shielding configuration needed in a specific circumstance.

In all embodiments, the connection member 10 may rest on any lower portion of a seat belt assembly such as a bolt 51 with legs 12 straddling the bolt or rest against a binding point 48. Additionally, legs 12 may rest directly on the floor 35 of a vehicle. The specific attachment depends on the specific seat belt receiver used in a given vehicle.

The apparatus described hereinabove is provided as a kit that can be used in the widest scope of applications.

While the invention has been described with respect to certain specific embodiments, it will be appreciated that many modifications and changes may be made by those skilled in the art without departing from the spirit of the invention. It is intended therefore, by the appended claims to cover all such modifications and changes as fall within the true spirit and scope of the invention.

What is claimed as new and what it is desired to secure by Letters Patent of the United States is:

1. A seat belt receiver attachment for an automobile vehicle comprising a flexible shield member having an inside surface locatable adjacent a holster worn by a user and an outside surface adjacent the seat belt receiver and securing means for attaching a lower portion of said shield member to the seat belt receiver of an automotive vehicle, said shield member including an enlarged upper portion and said lower portion, said lower portion of said shield member being reduced to fit within an opening adjacent the seat belt receiver and including a pair of laterally spaced openings, said securing means including a strap passing through said pair of spaced openings in said shield member.

2. The attachment as defined in claim 1 further including a connection member having an inside surface and an outside surface removably mountable closely adjacent a seat belt receiver, said connection member having a lower portion and an upper portion, said securing means attaching said upper portion of said connection member to said lower portion of said shield member.

3. The attachment as defined in claim 2 wherein said connection member includes a pair of spaced ears extending outwardly from said lower portion of said connection member, each said ear including an opening for passage of another securing means therethrough for securing said connection member to the seat belt receiver.

4. The attachment as defined in claim 2 wherein said connection member includes an elongate body having spaced side edge portions and a pair of spaced mounting holes, each hole being disposed adjacent a respective said side edge portion of said connection member, said securing means including a strap passing through said pair of spaced holes.

5. The attachment as defined in claim 2 wherein said connection member includes an elongate body having spaced side edge portions and a pair of spaced mounting holes, each hole being disposed adjacent a respective said side edge portion of said connection member, said elongate strap threadable through said one pair of spaced openings in said shield member and through said pair of spaced holes in said connection member, said strap being adapted to be tightened and to engage the seat belt receiver to locate and maintain said attachment in a selected orientation.

6. The attachment as defined in claim 2 wherein said connection member includes an elongate body, said body including a plurality of spaced transverse score lines permitting breakage of said body along a selected said score line to shorten the length of said body as desired by a user.

7. The attachment as defined in claim 2 wherein said lower portion of said connection member includes a pair of spaced legs located below the seat belt receiver for locating said attachment in a position desired by a user.

8. The attachment as defined in claim 2 wherein said connection member includes a plurality of vertically spaced transverse score lines defining a plurality of transverse panels for breaking said connection member to adjust the length thereof, and a plurality of pairs of spaced holes located in each said transverse panel, said strap passing through a selected said pair of spaced holes.

9. The attachment as defined in claim 2 further including a first fastener portion attached to said outside surface of said shield member and a second fastener portion attached to said inside surface of said connection member, said fasteners portions engaging each other for removably holding said shield member and said connection member together.

10. The attachment as defined in claim 1 wherein said shield member includes a flexible planar member conformable to a portion of a body and an attached holster of a user when a seat belt is secured into the seat belt receiver whereby said planar member shields a seat belt receiver from engaging an attached holster of a user.

11. The attachment as desired in claim 1 further including a connection member having a pair of spaced ears extending outwardly from said lower portion of said connection member, each said ear including an opening for passage of said strap therethrough for securing said connection member to the seat belt receiver.

12. A seat belt receiver attachment for an automotive vehicle comprising an elongate connection member having an inside surface and an outside surface removably mountable closely adjacent a seat belt receiver, said connection member having a lower portion including a flared flange end and a pair of spaced apart ears subtending from said flange end, and a planar flexible shield member locatable between a holster worn by a user and the seat belt receiver, said shield member having an inside surface locatable adjacent the holster worn by a user and an outside surface adjacent the seat belt receiver, and securing means for attaching said shield member to said upper portion of said connection member.

13. The attachment as defined in claim 12 wherein said shield member includes an enlarged upper portion and a lower portion having side edges, said lower portion of said shield member being reduced in size to fit within an opening adjacent the seat belt receiver including a plurality of pairs of laterally spaced mounting holes, each said hole being adjacent a respective said edge for securing said shield member to said connection member.

14. The attachment as defined in claim 13 wherein said connection member includes spaced side edge portions and a plurality of pairs of spaced mounting holes, each said hole being disposed adjacent a respective said side edge portion for securing said connection member to said shield member.

15. The attachment as defined in claim 14 wherein said securing means includes an elongate strap threadable through at least one said pair of spaced mounting holes in said shield member and through at least one said pair of spaced mounting holes in said connection member.

16. The attachment as defined in claim 14 wherein said body of said connection member includes a plurality of transverse score lines for breaking said body along a said score line to shorten the length of said body.

17. The attachment as defined in claim 14 wherein said lower portion of said connection member includes a pair of spaced legs to locate said attachment below the seat belt receiver for securing said attachment in a position desired by a user.

18. The attachment as defined in claim 14 wherein said flexible planar member conformable to a portion of the body of a user when a seat belt is secured into a seat belt receiver.

19. The attachment as defined in claim 14 wherein said connection member includes a plurality of vertically spaced transverse score lines for breaking off a portion of said connection member to adjust the length thereof.

20. The attachment as defined in claim 14 wherein said pair of spaced ears extending outwardly from said lower portion of said connection member, each said ear includes an opening for passage of securing means therethrough for securing said connection member to the seat belt receiver.

21. The attachment as defined in claim 14 further including a first fastener attached to said outside surface of said shield member and a second fastener attached to said inside surface of said connection member, said fasteners cooperating for removably holding said shield member and said connection member together.

22. The attachment as defined in claim 12 wherein said connection member includes a pair of spaced ears extending outwardly from said lower portion of said connection member, each said ear including an opening for passage of securing means therethrough for securing said connection member to the seat belt receiver.

23. A seat belt receiver attachment for an automotive vehicle comprising an elongate connection member having an inside surface and an outside surface removably mountable closely adjacent a seat belt receiver, said connection member having a lower portion including a lower flared flange end and a pair of spaced apart ears subtending from said end portion, and a planar flexible shield member locatable between a holster worn by a user and the seat belt receiver, said shield member having an inside surface locatable adjacent the holster worn by a user and an outside surface adjacent the seat belt receiver, securing means for attaching said shield member to said upper portion of said connection member, said connection member and said shield member each including spaced side edge portions and a plurality of pairs of spaced mounting holes, each said hole being disposed adjacent a respective said side edge portion for securing said connection member to said shield member, said securing means including an elongate strap threadable through at least one mounting hole in said shield member and through at least one said mounting hole in said connection member.

* * * * *